US008544517B2

(12) United States Patent
Hong et al.

(10) Patent No.: US 8,544,517 B2
(45) Date of Patent: Oct. 1, 2013

(54) MULTI-LAYERED AIR PERMEATION PREVENTING LAYER OF PNEUMATIC TIRES

(75) Inventors: Gi-Il Hong, Gyeongsangbuk-do (KR); Gi-Sang Song, Gyeongsangbuk-do (KR); Sang-Hyun Baek, Gyeongsangbuk-do (KR)

(73) Assignee: Kolon Industries, Inc., Kwanchen (KR)

( * ) Notice: Subject to any disclaimer, the term of this patent is extended or adjusted under 35 U.S.C. 154(b) by 782 days.

(21) Appl. No.: 11/630,998

(22) PCT Filed: Jun. 28, 2005

(86) PCT No.: PCT/KR2005/002019
§ 371 (c)(1),
(2), (4) Date: Dec. 28, 2006

(87) PCT Pub. No.: WO2006/001680
PCT Pub. Date: Jan. 5, 2006

(65) Prior Publication Data
US 2009/0038727 A1    Feb. 12, 2009

(30) Foreign Application Priority Data

Jun. 28, 2004   (KR) .................. 10-2004-0048866

(51) Int. Cl.
*B60C 5/00*     (2006.01)
*B60C 5/14*     (2006.01)

(52) U.S. Cl.
USPC .................................. 152/510; 152/450

(58) Field of Classification Search
None
See application file for complete search history.

(56) References Cited

U.S. PATENT DOCUMENTS

| | | | | |
|---|---|---|---|---|
| 5,851,323 | A * | 12/1998 | Kaido et al. ............... | 152/510 |
| 6,062,283 | A * | 5/2000 | Watanabe et al. .......... | 152/510 |
| 6,079,466 | A | 6/2000 | Watanabe et al. | |
| 6,359,071 | B1 * | 3/2002 | Watanabe et al. .......... | 525/184 |
| 6,698,483 | B2 * | 3/2004 | Pagano et al. .............. | 152/532 |

FOREIGN PATENT DOCUMENTS

| | | |
|---|---|---|
| EP | 0 337 279 A2 | 10/1989 |
| JP | 1-314164 A | 12/1989 |
| JP | 5-50807 * | 3/1993 |
| JP | 6-40207 A | 2/1994 |
| JP | 8-216610 A | 8/1996 |
| JP | 8-217922 A | 8/1996 |
| JP | 8-259741 A | 10/1996 |
| JP | 10236105 * | 9/1998 |

OTHER PUBLICATIONS

Machine translation of JP 5-50807, 1993.*

* cited by examiner

*Primary Examiner* — Justin Fischer
(74) *Attorney, Agent, or Firm* — Birch, Stewart, Kolasch & Birch, LLP

(57) ABSTRACT

The present invention provides a multi layered air permeation preventive layer of pneumatic tires having −50 to −10$_i$ É of the steep decreasing range of the elastic modulus includes inner liner layer of a non-drawn film formed from a polymer composition including 60 to 90 wt. % of a thermoplastic resin and 10 to 40 wt. % of an elastomer, and carcass layer coated on the inside and outside of the inner liner layer, the tire thus manufacture has no fracture under a severe deformation during the tire shaping process, facilitating the tire manufacture, and exhibits an air permeation preventive property as an excellent air permeation preventive layer.

4 Claims, 2 Drawing Sheets

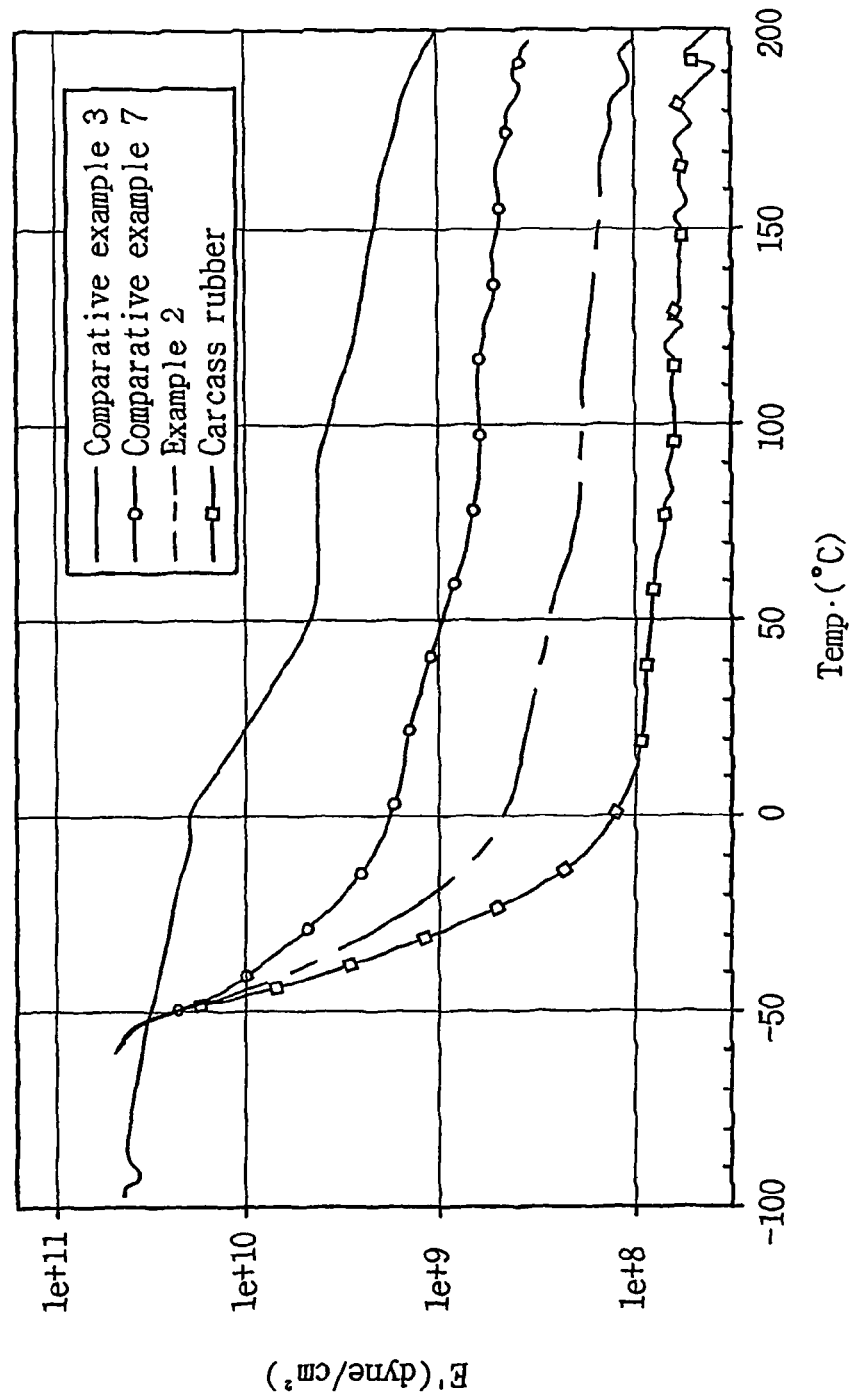

MULTI-LAYERED AIR PERMEATION PREVENTING LAYER OF PNEUMATIC TIRES

TECHNICAL FIELD

The present invention relates to a multi layered air permeation preventing layer of pneumatic tires. More specifically, the present invention relates to a multi-layer air permeation preventing layer of pneumatic tires which includes inner liner layer obtained by the polymer composition including a thermoplastic resin and an elastomer, and a carcass rubber layer coated on the inside and outside of the inner liner layer.

BACKGROUND ART

The most important problem the automobile industry is faced with is the reduction of fuel consumption rate. This increasingly requires the reduction of the weight of tires.

Currently, the inside of tires has an inner liner or an air permeation preventing layer that is made of a halogenated butyl rubber or another rubber having low air permeation.

However, the halogenated butyl rubber employed as an inner liner or an air permeation preventing layer has a high hysteresis loss, causing a ripple on the inner rubber of a carcass layer and the air permeation preventing layer after a vulcanization of the tire and thereby deforming both the carcass layer and the air permeation preventing layer. This leads to an increased rolling resistance.

As a solution of this problem, a rubber sheet called "tie rubber" having a low hysteresis loss is inserted between the air permeation preventing layer (halogenated butyl rubber) and the carcass layer. The insertion of the rubber sheet increases the total thickness of the tire layer above 1 mm (1,000 µm) in addition to the thickness of the air permeation preventing layer made of a halogenated butyl rubber. This results in the increased weight of the complete tire.

In an attempt to solve this problem, there have been suggested techniques of employing different materials for the air permeation preventing layer of pneumatic tires instead of such a conventional rubber material as halogenated butyl rubber having low air permeation.

For example, Japanese Patent Laid Open No. 6-40207 proposes a technique of providing an air permeation preventing layer in the inside of the tire by laminating a low air permeation layer including a polyvinylidene chloride film or an ethylene-vinyl alcohol copolymer film and an adhesive layer including a polyolefin film, an aliphatic polyamide film, or a polyurethane film to form a thin film, affixing the thin film to the inner side of the green tire consisting of non-vulcanized rubber to make the adhesive layer in contact with the carcass layer, and then vulcanizing and shaping the green tire.

The use of a thin air permeation preventing layer makes it possible to reduce the weight of the tire without deteriorating the maintenance of pneumatics.

However, the thermoplastic multi-layer film, if used for an inner liner or another air permeation preventing layer, has a low elongation with respect to repeated deformations while in use, causing a lot of cracks on it and hence a deterioration of air tightness.

In the conventional tire manufacturing method that requires a step of shaping an inner liner, the thermoplastic film commercially available encounters oriented crystallization caused by drawing and heat crystallization by thermosetting after drawing and annealing processes, providing poor elongation against deformation in the shaping process with a consequence of fracture. In conclusion, the conventional manufacturing methods make it impossible to realize the fabrication of tires from thermoplastic films commercially available.

DISCLOSURE OF INVENTION

In an attempt to derive an alternative method for employing a thermoplastic resin as an inner liner, the inventors of the present invention have found out that multi layered air permeation preventing layer for pneumatic tires having an inner liner layer of the non-drawn film formed from a polymer composition including a mixture of an elastomer and a thermoplastic resin excellent in air permeation preventive property, and the carcass layer on the inner and outer sides of the inner liner layer can be used as an air permeation preventive layer to guarantee high elongation against deformation during the shaping process, a good air permeation preventive property and the thermoplastic film act like a carcass rubber owing to high thickness difference between carcass rubber and thermoplastic film.

It is therefore an object of the present invention to provide a multi layered air permeation preventing layer for pneumatic tires which can be easily formed the tire owing to having excellent durability against deformation during the vulcanization, and has good air tightness property, and does not affect other tire properties thanks to thermoplastic resin acts like a rubbery state.

To achieve the above object of the present invention, there is provide a multi layered air permeation preventing layer of pneumatic tires comprising the inner liner layer of a non-drawn film formed from polymer composition including 60 to 90 wt. % of a thermoplastic resin and 10 to 40 wt. % of an elastomer, and the carcass rubber layer coated on the inside and outside of the inner liner layer, wherein the multi layered air permeation preventing layer of pneumatic tires has a $-50$ to $-10°$ C. of steep decreasing range of the elastic modulus.

The present invention will be described in further detail as follows.

The multi layered air permeation preventing layer for pneumatic tires according to the present invention comprise a non-drawn film formed from polymer composition including a mixture of a thermoplastic resin and an elastomer as a inner liner layer, and a carcass rubber layer coated on the inside and outside of the inner liner layer.

The tire manufacturing process necessarily includes a shaping process, during which the film is formed to have the shape of a tire with an air blower at the room temperature. Accordingly, the inner liner must not have any fracture caused by the deformation in the shaping process. However, most of the films commercially available are not durable against deformation from oriented crystallization, heat crystallization and oriented crystallization after the drawing and annealing processes.

For that reason, the present invention applies deformation during the shaping process in the tire manufacturing process as a conception of film drawing at the room temperature.

Instead of forming a drawn film from a polymer composition including a thermoplastic resin and an elastomer, a non-drawn film is used to produce an inner liner without drawing or annealing so as to secure ductility against deformation in the shaping process.

The specific polymer composition for the non-drawn film of the present invention is as follows. The specific examples of the thermoplastic resin as used herein may include polyamide resins, e.g., nylon 6, nylon 66, nylon 46, nylon 11, nylon 12, nylon 610, nylon 612, nylon 6/66 copolymer, nylon Jun. 66, 19610 copolymer, nylon MXD, nylon 6T, nylon 6/6T copolymer, nylon 66/PP copolymer, or nylon 66/PPS copolymer; N-alkoxyalkylated polyamide resins, e.g., methoxymethylated nylon 6, methoxymethylated nylon 6/610, or methoxymethylated nylon 612; polyester resins, e.g., polybutyleneterephthalate, polyethyleneterephthalate, polyethyleneisophthalate, PET/PEI copolymer, polyacrylate, polybutylenenaphthalate, liquid crystal polyester, polyoxyalkylenediimido 2-oxygen/polybutylate terephthalate copolymer, or other aromatic polyesters; polynitrile resins, e.g., polyacrylonitrile(PAN), polymethacrylonitrile, acrylonitrile/styrene copolymer (AS), methacrylonitrile/styrene copolymer, or methacrylonitrile/styrene/butadiene copolymer; polymethacrylate resins, e.g., polymethylmethacrylate (PMMA), or polymethylmethacrylate; polyvinyl resins, e.g., vinyl acetate, polyvinyl alcohol (PVA), vinyl alcohol/ethylene copolymer (EVOH), polyvinylidenechloride(PVDC), polyvinylchloride(PVC), polyvinylchloride/polyvinylidenechloride copolymer, polyvinylidene chloride/methylacrylate copolymer, or polyvinylidenechloride/acrylonitrile copolymer, cellulose resins, e.g., cellulose acetate, or cellulose acetobutyrate; fluoride resins, e.g., polyvinylidenefluoride(PVDF), polyvinyl fluoride, polychlorofluoroethylene (PCTFE), or tetrafluoroethylene/ethylene copolymer; or amide resins, e.g., aromatic polyimide (PI), etc.

The elastomer compatible with these thermoplastic resins may include, if not specifically limited to, diene rubbers and their hydrogenated products, e.g., natural rubber, isoprene rubber, epoxidated natural rubber, styrene-butadiene rubber, butadiene rubber (high cis-butadiene rubber, or low cis-butadiene rubber), natural rubber-butadiene rubber, hydrogenated natural rubber-butadiene rubber, or hydrogenated styrene-butadiene rubber, olefin rubbers, e.g., ethylene-propylene rubber (EPDM), maleic acid-modified ethylene-propylene rubber, IIR, isobutylene and aromatic vinyl or diene monomer copolymer, acryl rubber, or ionomer; halogenated rubbers, e.g., Br—IIR, Cl—IIR, brominated isobutylene paramethylstyrene copolymer (Br—IPMS), CR, chlorohydrin rubber (CHR), chlorosulfonated polyethylene (CSM), chlorinated polyethylene (CM), or maleic acid-modified chlorinated polyethylene (M-CM); silicon rubbers, e.g., methylvinylsilicon rubber, dimethylsilicone rubber, or methylphenylvinylsilicon rubber; sulfur-containing rubbers, e.g., polysulfide rubber; fluoride rubbers e.g., vinylidene fluoride rubber, fluorine-containing vinylether rubber, tetrafluoroethylenepropylene rubber, fluorine-containing silicon rubber, or fluorine-containing phosphazene rubber; or thermoplastic elastomers, e.g., styrene elastomer, olefin elastomer, ester elastomer, urethane elastomer, polyamide elastomer, etc.

The composition of the thermoplastic resin and the elastomer can be determined according to the balance of film thickness, internal air permeation, and flexibility. Preferably, the polymer composition includes 60 to 90 wt. % of the thermoplastic resin and 10 to 40 wt. % of the elastomer. When the content of the elastomer exceeds 40 wt. %, the film of the polymer composition is not suitable for a tire inner liner because of its poor gas barrier property inadequate to the air insulation of the tire. With the content of the elastomer less than 10 wt. %, the film cannot realize the rubber-like elastomer features to give the difficulty in the manufacture of tires and make the tires vulnerable to fracture while running.

It is preferable that a suitable compatibility enhance is used as a third component when the thermoplastic resin is incompatible with the elastomer. The addition of such a compatibility enhancer deteriorates the interfacial tension between the thermoplastic resin and the elastomer to reduce the size of the rubber particles forming the dispersed phase, thereby helping the features of the two components realize more effectively. The compatible enhancer may include a copolymer having at least either one structure of the thermoplastic resin or the elastomer, or a copolymer structure having an epoxy group, a carbonyl group, a halogen group, an amine group, an oxazoline group, or a hydroxyl group that is reactive to the thermoplastic resin or the elastomer. The compatible enhancer is preferably selected depending on the types of the thermoplastic resin and the elastomer, and generally includes styrene/ethylene-butylene block copolymer (SEBS) and its maleic acid-modified product, EPDM, EPDM/styrene or EPDM/acrylonitrile graft copolymer and its maleic acid-modified product, styrene/malate copolymer, reactive phenoxine, etc. The content of the compatibility enhancer is, if not specifically limited to 0.5 to 10 parts by weight with respect to 100 parts by weight of the thermoplastic resin and the elastomer.

In addition to the mentioned essential polymer components, a compatibility enhancer polymer or another polymer can be optionally used as long as it does not deteriorate the necessary properties of the polymer composition for tires. The use purpose of another polymer is improving the compatibility of the thermoplastic resin and the elastomer, enhancing the film forming ability of the materials and the heat resistance, and reducing the manufacture cost. The specific examples of such a material may include polyethylene, polypropylene, polystyrene, ABS, SBS, SEBS, polycarbonate, etc. The material may also include another olefin copolymers, their maleic acid-modified, or their derivative containing a glycidyl group. The polymer composition of the present invention may further include additives that can be mixed with a polymer formula, such as filler, carbon, powdered quartz, calcium carbonate, alumina, titan dioxide, etc.

The polymer composition thus obtained is subjected to melt-extrusion and quenching to produce a non-drawn sheet, which is applied as an inner liner.

The inner liner of the present invention thus obtained, which has an oxygen permeability of less than $15 \times 10^{-3}$ ccm/$m^2 \cdot 24$ hr·atm, and a fracture elongation of more than 200% at the room temperature, causes no fracture even by severe deformation during the tire shaping process, facilitating the tire manufacture, and provides good air tightness and oxygen leakage preventive ability.

Preferably, the non-drawn sheet has the maximum value of the complete elastic deformation interval, that is, a yield point of more than 10% at −35° C.

The inner liner of the tire thus manufactured is also deformed under different deformation conditions, which cause a deterioration of the performance or the inner liner. Especially, the deformation caused under severe conditions due to temperature variations during the use of the tire further deteriorates the performance of the inner liner.

Accordingly, the inner liner of the present invention as a non-drawn sheet has a yield point of more than 10% at −35° C., so it can maintain the performance of the inner liner in spite of a tire deformation under normal weather conditions and a deformation under severe cold conditions of −35° C.

In applying such a thermoplastic film to tires, a behavior like a rubbery state should be realized. For this purpose, the carcass rubber layer may be adhered to the outside and inside of the inner liner so as that thin thickness thermoplastic resin film can act identically like thick carcass rubber compared with it.

When the behavior like the rubbery state is applied to the thermoplastic resin film, it happens a problem that an oxygen permeability which is main property of the inner liner is increased. Accordingly, it is very difficult that both the behavior like the rubber and the oxygen permeability are satisfied at the same time because of their opposed properties. However, if thickness difference between the inner liner on the film and the carcass rubber, and the adhesive strength are large, the thermoplastic resin film can act identically like the tire rubber without acting independently.

In using these properties, the reduction of the weight of tires may be satisfied at the same time, and if the adhesive strength of film and tire are permitted at its maximum, a behavior of film can max be reduced owing to the inner line film having the thickness against the reduction of air tightness with thick thickness of carcass rubber. it is preferable that a suitable thickness of carcass rubber layer is 0.5 to 5 mm.

Also, carcass rubber layers may be affixed to both sides of the inner liner so as to compensate for scratch resistance.

The adhesive as used herein may include anything if used when manufacturing a commercial tire and is not specially limited.

For this purpose, an adhesive layer must be provided on both sides of the inner liner by adhesive coating. In addition, a peeling paper is used so as to prevent adhesion between the both-sided adhesive layers for easier packaging in the roll form. The peeling paper as used herein may include a polyethyleneterephthalate, polypropylene, polyethylene films and so on. The vulcanization process of inner liner is performed according to a general tire manufacturing method after such an adhesion.

It is desirable that the multi-layered air permeation preventing layer manufactured by the non-drawn film adhered to the carcass rubber layer on the both side of the inner liner layer has a steep decreasing range in elastic modulus of −50 to −10° C.

The "steep decreasing range in elastic modulus" of the present invention means a steep decreasing range in elastic modulus value according to a temperature change as shown in a graph of FIG. 2.

Preferably, the multi-layered air permeation preventing layer satisfy the following equation 1 at the described temperature range, that is, from −50° C. to −10° C.

$$E'^1/E'^2 = 100 \sim 1,000, \quad \text{Equation 1}$$

wherein, the $E'^1$ is the elastic modulus value at −50° C. and $E'^2$ is the elastic modulus value at −10° C.

Further, at the temperature range of 0 to 200° C., it is desirable that elastic modulus values satisfy the following equation 2.

$$E'^3/E'^4 = \text{less than } 10, \quad \text{Equation 2}$$

wherein, the $E'^3$ is the elastic modulus value at 0° C. and $E'^4$ is the elastic modulus value at 200° C.

Also, the absolute value of the elastic modulus of the present invention is preferably less than $10^{10}$ dyne/cm at −35° C.

BRIEF DESCRIPTION OF DRAWINGS

FIG. 2 is a graph illustrating a change of an elastic modulus value according to time to example 2, comparative example 3, comparative example 7, and carcass rubber.

BEST MODE FOR CARRYING OUT THE INVENTION

Figure 1:
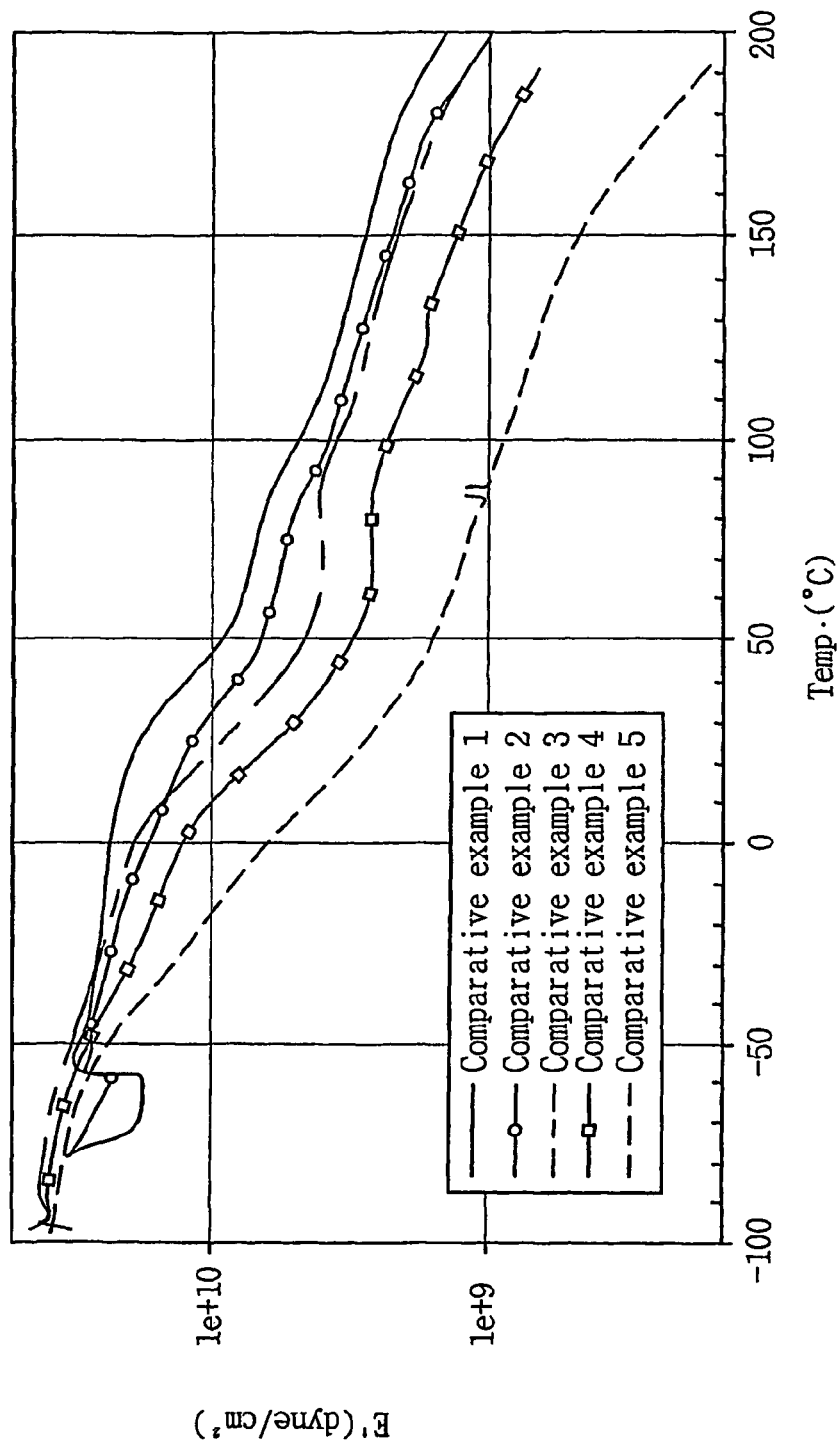
FIG. 1 is a graph illustrating a change of an elastic modulus value according to time to a non-drawn film sheet of a thermoplastic resin obtained by comparative examples 1 to 5.

Hereinafter, the present invention will be described in detail by way of the following examples, which are not intended to limit the scope of the present invention.

EXAMPLE 1

A polymer composition including a blend of nylon 6 and a polyamide elastomer at a weight ratio of 80 to 20 was melt at 260° C., extruded with a annular die, and quenched to obtain a 50 μm-thickness non-drawn polyamide sheet. The adhesive including aqueous type latex and isocyanate coated on the both sides of inner and outer sides of the non-drawn polyamide sheet under following coating condition to form the carcass rubber layer, and it vulcanized at 160° C. and 30 kgf of the pressure for 15 minutes to form the multi layered air permeation preventing layer for pneumatic tires.

Adhesive Coating Condition
Coating rate: 30 m/min
Coating width: 520 mm
Coating method: coating using Gravia of 200 mesh
Rubber roll: 505 mm rubber roll
Dry condition: at 130° C. of hot air, 10 m of line length
Peeling film: PET film having 12 μm thickness

EXAMPLE 2

Procedures were performed to prepare a multi layered air permeation preventing layer in the same manner as described in Example 1, excepting that the 50 μm-thickness non-drawn polyamide sheet formed from the weight ratio of nylon 6 to polyamide elastomer was 70 to 30 as a inner liner layer.

COMPARATIVE EXAMPLE 1

Procedures were performed to prepare a multi layered air permeation preventing layer in the same manner as described in Example 1, excepting that the 50 μm-thickness non-drawn polyamide sheet formed from nylon 6 was used alone without any elastomer, and adhesive of the carcass rubber layer was not performed.

COMPARATIVE EXAMPLE 2

Procedures were performed to prepare a multi layered air permeation preventing layer in the same manner as described in Example 1, excepting that adhesive of the carcass rubber layer was not performed.

COMPARATIVE EXAMPLE 3

Procedures were performed to prepare a multi layered air permeation preventing layer in the same manner as described in Example 2, excepting that adhesive of the carcass rubber layer was not performed.

COMPARATIVE EXAMPLE 4

Procedures were performed to prepare a multi layered air permeation preventing layer in the same manner as described in Example 1, excepting that the 50 μm-thickness non-drawn polyamide sheet formed from the weight ratio of nylon 6 to polyamide elastomer was 50 to 50 as a inner liner layer, and adhesive of the carcass rubber layer was not performed.

COMPARATIVE EXAMPLE 5

Procedures were performed to prepare a multi layered air permeation preventing layer in the same manner as described in Example 1, excepting that the 50 μm-thickness non-drawn polyamide sheet formed from polyamide elastomer was used alone, and adhesive of the carcass rubber layer was not performed.

COMPARATIVE EXAMPLE 6

Procedures were performed to prepare a multi layered air permeation preventing layer in the same manner as described in Example 1, excepting that adhesive of the carcass rubber layer was coated on the one side of the inner liner layer.

COMPARATIVE EXAMPLE 7

Procedures were performed to prepare a multi layered air permeation preventing layer in the same manner as described in Example 2, excepting that adhesive of the carcass rubber layer was coated on the one side of the inner liner layer.

The multi layered air permeation preventing layers obtained in Examples 1 and 2 and Comparative Examples 1 to 7 were measured oxygen permeability and tensile strength at the room temperature and low temperature, and the results are presented in Tables 1 and 2.

The specific measurement methods are described as follows.

(1) Oxygen permeability: ASTM D 3895, with an oxygen permeability analyzer (Model 8000, Illinois Instruments Co., Ltd.)

(2) Room-Temperature Tensile Strength

Instrument—Universal Material Tester (Model 4204, Instron Co., Ltd.)

Head Speed—300 mm/min
Grip Distance—100 mm
Sample Width—10 mm
Temperature—Room Temperature (25° C., 60 RH %)

(3) Low-Temperature Tensile Strength

Instrument—Universal Material Tester (Model 4204, Instron Co., Ltd.)

Head Speed—300 mm/min
Grip Distance—35 mm
Sample Width—50.8 mm
Temperature—−35° C.

(4) Visco-Elastic Behavior

Instrument—Rheovibron(DDV-II EP, Orientech Co., Ltd.)
Condition—110 Hz, 2° C./min, 1 count/min
Temperature—−100~200° C. (cooling with liquid nitrogen gas)

The condition for affixing and vulcanizing the carcass rubber layer is the same with vulcanization condition when manufacturing tires. The practical tires include the carcass rubber thickness of about 1 mm adhered to the most inside layer of the tire when affixing both sides. On the opposite side, however, a viscoelastic behavior will be very rubbery because the carcass rubber as a main body of tire has a thickness of more than 1 mm. In using the estimating method, the final matter properties thereafter will be estimated.

TABLE 1

| Sample | Oxygen permeability (ccm/m² · 24 hr · atm) |
|---|---|
| Example 1 | $4.9 \times 10^{-3}$ |
| Example 2 | $6.2 \times 10^{-3}$ |
| Comparative example 1 | $1.8 \times 10^{-3}$ |
| Comparative example 2 | $4.9 \times 10^{-3}$ |
| Comparative example 3 | $6.2 \times 10^{-3}$ |
| Comparative example 4 | $17.9 \times 10^{-3}$ |
| Comparative example 5 | $154.8 \times 10^{-3}$ |
| Comparative example 6 | $4.9 \times 10^{-3}$ |
| Comparative example 7 | $6.2 \times 10^{-3}$ |

As can be seen from Table 1, when the content of the polyamide elastomer amounts to exceed 40 wt. %, the films had such an oxygen permeability to exhibit a poor gas barrier property inadequate to the air insulation of the tire. Therefore, the films were difficult to use as a tire inner liner.

Further, the adhesion of the carcass rubber layer has no effect on a gas barrier property whether the layer is one side or both sides.

As the result to tensile fracture elongation at the room temperature and the low temperature, the matter property change is observed according to the content of the elastomer as the following table 2 which are shown only comparative examples not affixing the carcass rubber layer.

TABLE 2

| | Room temperature (25° C.) | Low temperature (−35° C.) | |
|---|---|---|---|
| | Maximum fracture elongation (%) | Yield Point (%) | Maximum fracture elongation (%) |
| Comparative Example 1 | 362.4 | 7.3 | 60 |
| Comparative Example 2 | 412.2 | 12.7 | 140 |
| Comparative example 3 | 485.6 | 12.9 | 151 |
| Comparative example 4 | 543.2 | 13.8 | 167 |
| Comparative example 5 | 635.2 | 24.2 | 230 |

As can be seen from Table 2, all the samples had a room-temperature elongation of more than 300% high enough to stand a deformation of about 200% at the room temperature during the shaping process.

In the low-temperature measurements, the sample of the Comparative Example 1 had a yield point of 7.3%, which means that the tire manufactured cannot guarantee a complete elasticity recovery under a deformation of more than 7.3% at a low temperature of −35° C. while running and possibly has a permanent deformation to cause a serious problem in maintaining the air tightness. In addition, other samples excepting Comparative Example 1 had a yield point of more than 10%, implementing that the tire manufactured realizes a complete elasticity recovery under a deformation of less than 10% even at a low temperature of −35° C. while running, without affecting other properties such as durability. However, in the case of the comparative examples without carcass rubber layer can not have a steep decreasing range of a elastic modulus, as shown in the visco-elastic behavior following Figures.

The result of viscoelastic behavior is shown in FIGS. 1 and 2.

FIG. 1 is a measurement result of viscoelastic behavior to comparative examples 1 to 5. Referring to FIG. 1, the deterioration of elastic modulus increase according to an increase of the content of the elastomer. However, it will be known that the absolute value is large without getting out of a limitation of the thermoplastic resin.

FIG. 2 is an example in case of the carcass rubber being adhered and also shows the viscoelastic behavior of only the carcass rubber layer of vulcanized 1 mm thickness for reference.

Referring FIG. 2, the elastic modulus differences between the comparative example 3 of the thermoplastic resin and the carcass rubber are to differ from their absolute value and shape. However, example 2 and comparative example 7 show very rubbery behavior. Particularly, when the carcass rubber adhesive side is both sides of the thermoplastic resin film (Example 2), it brings a synergy effect of rubbery behavior more than adhered to one side (Comparative example 7).

As shown from the result of FIG. 2, the multi-layered air permeation preventing layer of pneumatic tires according to the present invention includes the steep decreasing range of the elastic modulus at $-50$~$-10°$ C., and it satisfy the following equation.

$$E'^1/E'^2 = 100\text{-}1,000 \qquad \text{Equation 1}$$

Wherein, the $E'^1$ is the elastic modulus value at $-50°$ C. and $E'^2$ is the elastic modulus value at $-10°$ C.

Further, within temperature scope of $0$~$200°$ C., the elastic modulus values at $0°$ C. and $200°$ C. satisfy the following equation.

$$E'^3/E'^4 = \text{less than 10} \qquad \text{Equation 2}$$

Wherein, the $E'^3$ is the elastic modulus value at $0°$ C. and $E'^4$ is the elastic modulus value at $200°$ C.

Further, the absolute value of the elastic modulus is less than $10^{10}$ dyne/cm$^2$ at $-35°$ C.

Industrial Applicability

As described above in detail, when a non-drawn sheet obtained from a polymer composition including a thermoplastic resin and an elastomer is applied to an inner liner and a carcass rubber layer adheres to both the sides according to the present invention, the tire has no fracture under a severe deformation during the tire shaping process owing to a fracture elongation of more than 200%, and thus being easy to manufacture the tire and preventing bad impact to tire property by acting a rubbery behavior in spite of the thermoplastic resin film without a reduction of air tightness. Accordingly, the present invention is useful as an air permeation preventive layer of pneumatic tires.

While this invention has been described in connection with the embodiments, it is to be understood to those skilled in the art that the invention is not limited to the disclosed embodiments, but, on the contrary, is intended to cover various modifications and equivalent arrangements. Particularly, the number of layers is flexible and the core/shell structure can have a gradient. Accordingly, the technical coverage of the present invention is to be included within the spirit and scope of the appended claims.

What is claimed is:

1. A multi-layered air permeation preventing layer of pneumatic tires comprising:

an inner liner layer of a non-drawn film formed from polymer composition comprising 80 to 90 wt. % of a thermoplastic resin and 10 to 20 wt. % of an elastomer; and carcass rubber layers having the same composition are adhered to the outside and inside of the non-drawn film, wherein the multi-layered air permeation preventing layer has a $-50°$ C. to $-10°$ C. of a steep decreasing range of an elastic modulus, wherein the elastic modulus at the steep decreasing range of $-50°$ C. and $-10°$ C. satisfies the following equation 1:

$$E'^1/E'^2 = 100\text{-}1,000; \qquad \text{Equation 1}$$

wherein the $E'^1$ is the elastic modulus value at $-50°$ C., and $E'^2$ is the elastic modulus value at $-10°$ C., wherein, the non-drawn film is a non-vulcanized film, wherein the thermoplastic resin is a polyamide resin and the elastomer is a polyamide elastomer, wherein the thickness of the carcass rubber layer adhered to the inside of the non-drawn film is 1 to 5 mm, and wherein the non-drawn film has a fracture elongation of more than 200% at the room temperature and a yield point of more than 10% at $-35°$ C.

2. The multi-layered air permeation preventing layer of pneumatic tires as claimed in claim 1, wherein an elastic modulus within a temperature range of $0°$ C. to $200°$ C. satisfies the following equation 2:

$$E'^3/E'^4 = \text{less than 10}; \qquad \text{Equation 2:}$$

wherein $E'^3$ is the elastic modulus value at $0°$ C., and $E'^4$ is the elastic modulus value at $200°$ C.

3. The multi-layered air permeation preventing layer of pneumatic tires as claimed in claim 1, wherein the inner liner layer has an oxygen permeability of less than $15 \times 10^{-3}$ ccm/m$^2 \cdot$24 hr·atm, and a fracture elongation of more than 200% at room temperature.

4. The multi-layered air permeation preventing layer of pneumatic tires as claimed in claim 1, wherein the thickness of the carcass rubber layer adhered to the outside of the non-drawn film is 1 mm to 5 mm.

* * * * *